US006955785B2

(12) United States Patent
Saga et al.

(10) Patent No.: US 6,955,785 B2
(45) Date of Patent: Oct. 18, 2005

(54) ALUMINUM ALLOY FOR RAPIDLY COOLED WELDING AND WELDING METHOD THEREFOR

(75) Inventors: Makoto Saga, Futtsu (JP); Yasutomo Ichiyama, Futtsu (JP); Toshiyasu Ukena, Tokyo (JP); Hirobumi Sonoda, Narashino (JP); Junichi Ibukuro, Narashino (JP); Takanori Yahaba, Wako (JP); Masato Takikawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/655,592

(22) Filed: Sep. 5, 2003

(65) Prior Publication Data

US 2004/0091387 A1 May 13, 2004

(30) Foreign Application Priority Data

Sep. 5, 2002 (JP) ...................................... 2002-259797

(51) Int. Cl.[7] ................................................ C22C 21/06

(52) U.S. Cl. ....................... 420/533; 420/538; 420/543; 420/547

(58) Field of Search ................................ 420/533, 538, 420/543, 547, 550, 551

(56) References Cited

FOREIGN PATENT DOCUMENTS

| | | | | |
|---|---|---|---|---|
| JP | 56102562 A | * | 8/1981 | ............. C22F/1/04 |
| JP | 60159145 A | * | 8/1985 | ........... C22C/21/00 |
| JP | 60159147 A | * | 8/1985 | ........... C22C/21/00 |
| JP | 09003582 A | * | 1/1997 | ........... C22C/21/06 |
| JP | 10-237577 | | 9/1998 | |

* cited by examiner

*Primary Examiner*—George Wyszomierski
*Assistant Examiner*—Janelle Morillo
(74) *Attorney, Agent, or Firm*—Arent Fox

(57) ABSTRACT

The present invention relates to an aluminum alloy for rapidly cooled welding. The alloy comprises, by weight, Mg: 0.4 to 7.0%, Cu: 0.05 to 1%, at least one kind of Mn: 0.8 to 2.5%, Cr: 0.35 to 2.0% and Fe: 0.7 to 1.5% and the balance of Al and inevitable impurities.

2 Claims, No Drawings

ALUMINUM ALLOY FOR RAPIDLY COOLED WELDING AND WELDING METHOD THEREFOR

BACKGROUND OF THE INVENTION

1. Field of the Invention

The present invention relates to an aluminum alloy for rapidly cooled welding, such as laser welding, i.e., welding construction material such as rolling materials and extruded materials, and aluminum thin sheet materials for automobiles. The present invention particularly relates to an aluminum alloy for rapidly cooled welding, and to a welding method therefor, in which welded portion is not softened and welding joint strength is high.

2. Related Art

Aluminum alloys are lighter than steel materials and are effective for lightening structures. Therefore, aluminum alloys have been widely used as materials for automobiles, railroad vehicles, and ships. It is preferable that welding joint efficiency, which is a ratio of welding joint strength to parent material strength, be not less than 1.0, since structural members are assembled by welding. In the aluminum alloys, a heat treatment type alloy, such as a Japanese Industrial Standard (JIS) A6000 type alloy, has high strength. However, when the heat treatment type alloy is welded, precipitates are solution treated by weld heat input, whereby the welded portion is softened and a subsequent heat treatment is required. A JIS A5000 type alloy is a non-heat treatment type alloy and is strengthened by Mg. The strength of a JIS A5000 type alloy is not decreased compared to that of a JIS A6000 type aluminum alloy by welding. However, a JIS A5000 type alloy is annealed by weld heat input and is decreased in strength due to coarsening of the grains, whereby the welding joint efficiency is mostly less than 1.0. Therefore, a technique in which Mg content is increased, and a technique in which Sc is added to increase the strength as shown in Japanese Patent Unexamined (KOKAI) Publication No.10-237577, has been considered.

However, when strength is increased by adding Sc, the production cost is high because Sc is expensive. Moreover, although increasing Mg content is effective for strengthening the welded portion, hot workability is decreased when Mg content is larger than a predetermined amount, whereby the Mg content has a limit. (See Japanese Patent Unexamined (KOKAI) Publication No. 10-237577, p.1)

SUMMARY OF THE INVENTION

Therefore, objects of the present invention are to provide an aluminum alloy for rapidly cooled welding and a welding method therefor, in which strength of welded portions, i.e., strength between a weld metal and a heat-affected zone, is increased without increasing Mg content, and the welding joint efficiency can be not less than 1.0, in a rapidly cooled welding method such as laser welding.

The inventors of this invention have extensively researched concerning a cooling rate of welding and a hardness change of the weld metal in many types of aluminum alloys, and have completed the present invention by discovering that the hardness of the welded portion can be increased by setting contents of Mn, Cr, Fe, V, Zr and Ni to be not less than a predetermined amount, in a welding method such as laser welding which has a rapid cooling rate, whereby the strength of the welded portion can be not less than that of a parent material.

That is, points of the present invention will be explained hereinafter. The present invention (1) provides an aluminum alloy for rapidly cooled welding, the alloy comprising by weight, Mg: 0.4 to 7.0%, Cu: 0.05 to 1%, at least one kind of Mn: 0.8 to 2.5%, Cr: 0.35 to 2.0% and Fe: 0.7 to 1.5%, and the balance of Al and inevitable impurities.

The present invention (2) also provides an aluminum alloy for rapidly cooled welding, the alloy comprising by weight, Mg: 0.4 to 7.0%, Cu: 0.05 to 1%, at least one kind of Mn: 0.8 to 2.5%, Cr: 0.35 to 2.0% and Fe: 0.7 to 1.5%, at least one kind of V: 0.5 to 1.0%, Zr: 2.0 to 2.5%, Ni: 3.0 to 3.5%, and the balance of Al and inevitable impurities.

The present invention aspect (3) provides a welding method for aluminum alloys recited in the present invention aspect (1) and (2), the method comprises the steps of welding, and cooling the welded portion at 500 to 10000° C./s of an average cooling rate from the melting point to 200° C.

DETAILED DESCRIPTION OF THE INVENTION

Hereinafter, the present invention will be explained in detail. The present invention relates to an aluminum alloy for welding and to a welding method therefor, in which at least one kind of Mn, Cr, and Fe of a predetermined amount is contained so as to increase the strength of a weld metal.

Hereinafter, parts and reasons for limitation of each alloy element will be explained. Mg is a basic component and is required for securing strength of parent material and weld metal and for obtaining superior weld crack characteristics. The reason for limitation in which the Mg content is 0.4 to 7.0 wt % is as follows. That is, when the content is less than 0.4 wt %, sufficient strength cannot be obtained. When the content is greater than 7.0 wt %, deformation resistance at high temperatures is increased, whereby hot workability is decreased.

Cu is an effective element for increasing the strength of an alloy plate and for obtaining high stress corrosion cracking characteristics. However, when the content is less than 0.05 wt %, the above mentioned efficiencies cannot be obtained. When the content is greater than 1 wt %, overall corrosion resistance is decreased. Therefore, the Cu content is set to be 0.05 to 1.0 wt %.

Mn is a fundamental element in alloys of type intended in the present invention. Mn is also effective for maintaining the strength of a parent material. Mn exists in the parent material in a state of a solid solution and in a crystallized state ($MnAl_6$). However, when welding is performed, the above-mentioned crystallized material is completely melted and solidified in a cooling process. In the cooling process, in a case of a welding method in which a cooling rate is high, such as laser welding, Mn once melted in a weld metal remains as a supersaturated solid solution without crystallizing after solidifying and cooling. That is, the solubility limit can be expanded by increasing the cooling rate, and the hardness can be extremely increased. Therefore, Mn is effective for increasing the strength of a welding joint obtained by the rapidly cooled welding such as in laser welding. The reason for the limitation in which the Mn content is 0.8 to 2.5 wt % is as follows. That is, when the content of Mn is less than 0.8 wt %, strengthening by the supersaturated solid solution obtained by rapidly cooling cannot be sufficiently realized, whereby the hardness is not increased. When the content of Mn is more than 2.5 wt %, Mn is crystallized as a coarsened state, whereby workability is decreased.

Cr is a basic element in aluminum alloys of the present invention as well as Mn. Similarly to the case of Mn, Cr exists in a state of a solid solution and a compound ($CrAl_7$). However, in a case of a welding method in which a cooling rate is high, such as laser welding, Cr once melted in weld metal remains as a supersaturated solid solution without crystallizing at solidifying or cooling processes until room temperature. As a result, strengthening based on solid-solution strengthening occurs and the hardness can be extremely increased. The reason for the limitation in which the Cr content is 0.35 to 2.0 wt % is as follows. That is, when the content of Cr is less than 0.35 wt %, strengthening by the supersaturated solid solution obtained by rapidly cooling cannot be sufficiently realized. When the content of Cr is more than 2.0 wt %, Cr is crystallized as a coarsened state similar to the case of Mn, whereby workability is decreased.

Fe is a fundamental element in aluminum alloys of the present invention along with Cr and Mn. Although Fe barely forms a solid solution in a parent material, Fe is melted in weld metal and forms a supersaturated solid solution, thereby increasing hardness. The reason for limitation in which the Fe content is 0.7 to 1.5 wt % is as follows. That is, when the content is less than 0.7 wt %, the above-mentioned efficiency cannot be demonstrated. When the content is greater than 1.5 wt %, formability is decreased. Accordingly, the Fe content is set to be 0.7 to 1.5 wt %.

Furthermore, V, Zr or Ni can preferably be added if necessary. V, Zr and Ni also contribute to increasing strength of welded portion after welding, and are effective for maintaining the strength of parent material and for suppressing the coarsening of grains. V, Zr and Ni have small solubility limits in parent material, and form intermetallic compounds. However, in a case of a welding method in which a cooling rate is high, such as laser welding, V, Zr and Ni are melted in weld metal and remain as a supersaturated solid solution without crystallizing at solidifying or cooling process until room temperature, similarly to Mn, Cr and Fe, whereby hardness is extremely increased by solid-solution strengthening.

The reasons for limitation in which composition ranges are V: 0.5 to 1.0 wt %, Zr: 2.0 to 2.5 wt %, Ni: 3.0 to 3.5 wt % are as follows. That is, when the V content is less than 0.5 wt %, the Zr content is less than 2.0 wt % or the Ni content is less than 3.0 wt %, efficiency in increasing strength can be sufficiently obtained. When the V content is more than 1.0 wt %, the Zr content is more than 2.5 wt % or the Ni content is more than 3.5 wt %, coarse crystallized material is formed in a parent material, whereby workability of the parent material is extremely decreased.

When the welded portion is cooled at less than 500° C./s of an average cooling rate from the melting point to 200° C. after welding, coarse precipitates which do not significantly contribute to strengthening are formed, whereby solid-solution strengthening cannot be sufficiently obtained, decreasing the joint efficiency. Moreover, it is extremely difficult to obtain a cooling rate which is more than 10000° C./s by rapidly cooled welding such as laser welding. Therefore, an average cooling rate from the melting point to 200° C. after welding is set to be 500 to 10000° C./s. Furthermore, in order to obtain a weld metal having excellent characteristics, it is preferable to cool at a range of 1000 to 8000° C./s from the melting point to 200° C.

EXAMPLES

The following description will discuss the present invention based upon examples in detail.

Example 1

Alloys in practical examples (Nos. 1 to 5) and alloys in comparative examples (Nos. 6 to 8) of compositions shown in Table 1 were respectively produced experimentally. The alloys in the practical examples (Nos. 1 to 4) were produced for the purpose of researching the influence of Mn and Cr, and the alloy in practical example (No. 5) was produced for the purpose of researching the influence of Fe. These alloys were cast and faced off after welding, and homogenizing treatment was subsequently performed at 550° C. for 10 hours to be hot rolled. Furthermore, cold rolling operations, intermediate annealing and cold rolling operations were performed, in that order, and final annealing was performed last, whereby alloy plates of 2.0 mm in thickness were produced. Laser welding was performed on the obtained alloy plates under conditions shown in Table 2, and characteristics of welded portion was researched. Distribution of hardness was measured by a Vickers hardness testing machine under conditions of 100 gf of load. The average cooling rate from the melting point to 200° C. in a joint temperature after welding was set to be 500 to 10000° C./s which is a preferable range in rapidly cooled welding such as laser welding.

TABLE 1

| | No. | Mg | Cu | Mn | Cr | Fe | Ti |
|---|---|---|---|---|---|---|---|
| practical example | 1 | 4.7 | 0.29 | 1 | 1.7 | 0.12 | 0.01 |
| | 2 | 4.56 | 0.06 | 1.5 | 1.1 | 0.12 | 0.02 |
| | 3 | 4.64 | 0.05 | 1.7 | 0.8 | 0.03 | 0.01 |
| | 4 | 4.69 | 0.15 | 1.9 | 0.5 | 0.2 | 0.02 |
| | 5 | 4.65 | 0.06 | 0.34 | 0.03 | 0.8 | 0.02 |
| comparative example | 6 | 4.4 | 0.1 | 0.05 | 0.04 | 0.13 | 0.01 |
| | 7 | 4.55 | 0.09 | 0.08 | 0.03 | 0.21 | 0.02 |
| | 8 | 4.79 | 0.15 | 0.04 | 0.09 | 0.2 | 0.02 |

TABLE 2

| laser output | welding rate | weld heat input | plate thickness | welding combination |
|---|---|---|---|---|
| 2.5 (KW (CW)) | 2 (m/min) | 750 (J/cm) | 2.0 (mm) | butt welding |

Tensile specimens of JIS No. 5 including the welded portion was produced, and tensile characteristics were subsequently measured by obtaining tensile strength and rupture position by using a tensile testing machine of Instron type. The results are shown in Table 3. In the alloys in practicle examples (Nos. 1 to 5), increasing of hardness can be observed compared with that of a parent material. Moreover, in the tensile test, the locations of rupture were all at a parent material in the practical examples (Nos. 1 to 5). Therefore, excellent joint strength can be obtained in the examples of the present invention.

TABLE 3

| | No. | offset yield strength of parent material (N/mm²) | tensile strength of parent material (N/mm²) | offset yield strength of joint (N/mm²) | tensile strength of joint (N/mm²) | rupture location |
|---|---|---|---|---|---|---|
| practical example | 1 | 122 | 284 | 125 | 281 | parent material |
| | 2 | 120 | 282 | 122 | 283 | parent material |
| | 3 | 119 | 279 | 124 | 280 | parent material |
| | 4 | 118 | 278 | 123 | 279 | parent material |
| | 5 | 114 | 268 | 120 | 270 | parent material |
| comparative example | 6 | 112 | 264 | 113 | 258 | welded portion |
| | 7 | 115 | 268 | 116 | 251 | welded portion |
| | 8 | 119 | 273 | 122 | 243 | welded portion |

In the above-mentioned Example 1, examples of efficiency in laser welding are shown. However, similar efficiency can be obtained in spot welding or semiconductor laser welding since cooling rates in these welding methods after welding are highly similar to the laser welding.

Example 2

Alloys in practical examples (Nos. 9 to 16) of compositions shown in Table 4 were spectively produced experimentally. Alloy plates 2.0 mm in thickness were produced by processing the alloys in practical examples (Nos. 9 to 16) under the conditions of production similar to Example 1. Laser welding was performed on the obtained alloy plates under the conditions shown in Table 2, and tensile strength and rupture position were measured in a method similar to Example 1. The results are shown in Table 5. As shown in Table 5, alloys in practical examples (Nos. 9 to 16) all ruptured at a parent material. Therefore, superior joint strength can be obtained by adding V, Zr and Ni.

TABLE 4

| | No. | Mg | Cu | Mn | Cr | Fe | V | Zr | Ni | Ti |
|---|---|---|---|---|---|---|---|---|---|---|
| practical example | 9 | 4.56 | 0.06 | 1.5 | 1.1 | 0.12 | — | — | — | 0.02 |
| | 10 | 4.51 | 0.05 | 1.4 | 1.0 | 1.11 | 0.8 | — | — | 0.01 |
| | 11 | 4.53 | 0.07 | 1.4 | 1.1 | 0.11 | — | 2.3 | — | 0.01 |
| | 12 | 4.55 | 0.06 | 1.5 | 1.0 | 0.12 | — | — | 3.4 | 0.01 |
| | 13 | 4.55 | 0.05 | 1.3 | 1.1 | 0.12 | 0.6 | 2.1 | — | 0.02 |
| | 14 | 4.56 | 0.06 | 1.5 | 1.1 | 0.11 | 0.7 | — | 3.1 | 0.02 |
| | 15 | 4.54 | 0.07 | 1.4 | 1.0 | 0.11 | — | 2.4 | 3.2 | 0.02 |
| | 16 | 4.55 | 0.07 | 1.4 | 1.0 | 0.12 | 0.7 | 2.2 | 3.1 | 0.01 |

TABLE 5

| | No. | offset yield strength of parent material (N/mm²) | tensile strength of parent material (N/mm²) | offset yield strength of joint (N/mm²) | tensile strength of joint (N/mm²) | rupture location |
|---|---|---|---|---|---|---|
| practical example | 9 | 120 | 282 | 122 | 283 | parent material |
| | 10 | 121 | 282 | 123 | 285 | parent material |
| | 11 | 123 | 284 | 122 | 284 | parent material |
| | 12 | 122 | 283 | 124 | 286 | parent material |
| | 13 | 123 | 284 | 123 | 286 | parent material |
| | 14 | 122 | 284 | 124 | 287 | parent material |
| | 15 | 123 | 284 | 123 | 287 | parent material |
| | 16 | 124 | 286 | 126 | 290 | parent material |

What is claimed is:

1. An aluminum alloy for rapidly cooled welding, the alloy comprising by weight:

Mg: 0.4 to 7.0%;

Cu: 0.05 to 1.0%;

Fe: 0.7 to 1.5%;

optionally, at least one kind of Mn: 0.8 to 2.5% and Cr: 0.35 to 2.0% ; at least one selected from the group consisting if V: 0.5 to 1.0 wt %, Zr 2.0 to 2.5 wt % and Ni: 3.0 to 3.5 wt %, and the balance of Al and inevitable impurities.

2. The aluminum alloy for rapidly cooled welding according to claim 1, wherein the aluminum alloy for rapidly cooled welding is welded and then cooled at a range of 1000 to 8000° C./s from the melting point to 200° C. after welding.

* * * * *